Figure 1:
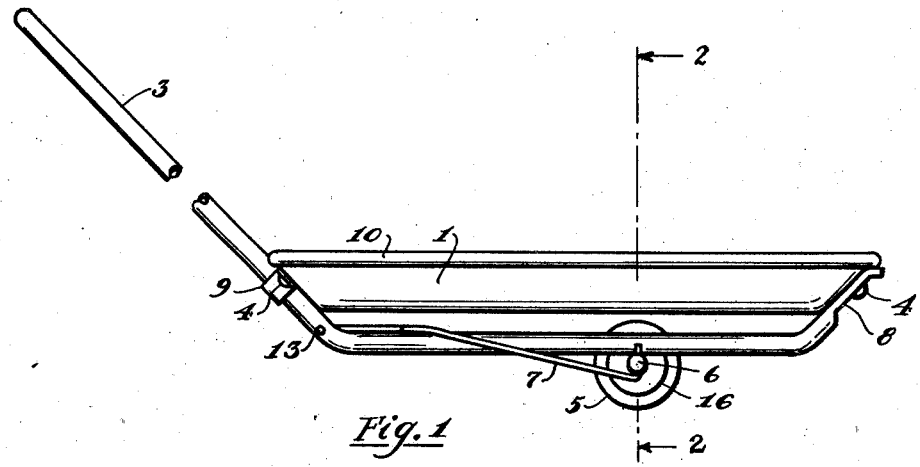

Dec. 23, 1947. W. STELZER 2,433,246
GARDEN CART
Filed Dec. 23, 1944

INVENTOR.
William Stelzer

Patented Dec. 23, 1947

2,433,246

UNITED STATES PATENT OFFICE 2,433,246

GARDEN CART

William Stelzer, Summit, N. J.

Application December 23, 1944, Serial No. 569,508

3 Claims. (Cl. 280—8)

The invention relates to garden carts and more particularly to a combination garden cart, lawn roller, and sled.

The object of the invention is to provide a universal device to serve as a garden cart, a lawn roller, or a sled where the limited use does not warrant the keeping of the conventional devices.

Another object is to provide an improved garden cart for pulling or pushing, having rollers to prevent damage to lawns or walks, as well as to increase the carrying capacity on soft ground.

A further object is to position the tray of the cart as close to the ground line as possible so that the material to be conveyed has to be lifted only to a minimum height, which is particularly advantageous when hauling rocks or other heavy objects.

A still further object is to provide sled runners as a part of the useful structure required for the cart and to provide means for quick removal of the rollers so that the structure may serve as a sled.

The invention also aims to produce a simplified construction that can be manufactured cheaply.

Figure 2:
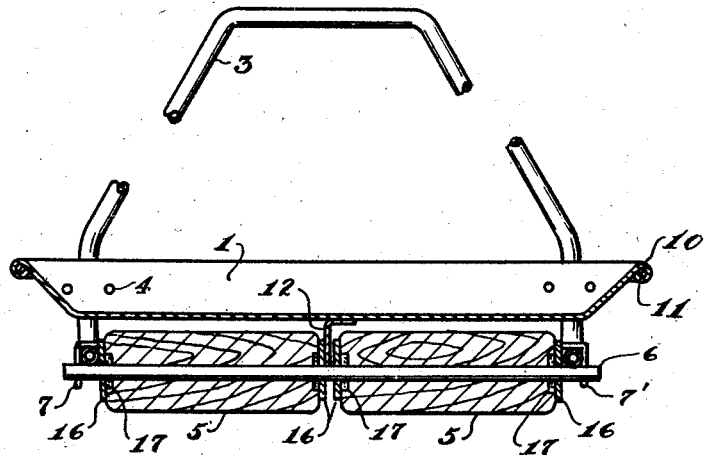

Other objects and advantages of this invention will be apparent from the following description considered in connection with the accompanying drawing submitted for the purpose of illustration and not to define the scope of the invention, reference being had for that purpose to the subjoined claims. In the drawing, wherein similar reference characters refer to similar parts throughout the several views:

Fig. 1 is a side elevation of the novel cart;

Fig. 2, a cross-section taken on line 2—2 of Fig. 1; and

Figure 3:
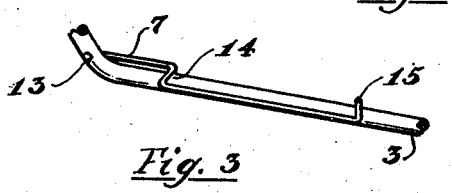

Fig. 3, a fragmentary perspective view of one of the runners and the means for retaining the rollers.

Before explaining the present invention in detail, it is to be understood that the invention is not limited in its application to the details of construction and arrangement of parts illustrated in the accompanying drawing, since the invention is capable of other embodiments and of being practised or carried out in various ways. Also it is to be understood that the phraseology or terminology employed herein is for the purpose of description and not limitation.

The improved cart comprises a shallow tray 1 secured to a tubular handle 3 by means of rivets or bolts 4, and a pair of wooden rollers 5 turning on an axle or shaft 6 held against said tubular handle by springs 7 and 7', which are of opposite hand. The frame-like handle 3 is formed of a single piece whose extremities are flattened at 8 to facilitate fastening to the tray. These extremities also provide a support when the cart is in a dumping position. At the opposite end of the tray the handle is clamped tightly to the tray with clamps 9 and bolts or rivets 4. The part of the handle positioned under the tray is substantially straight to serve as sled runners when the rollers are removed. The tray 1 has a rim reinforced with a bead 10 in which a wire 11 is enclosed. The bottom is stiffened by a longitudinally disposed rib 12 spot-welded or otherwise secured to the tray. The contour of the lower edge of the rib may be parallel with the lower surface of the runners whereby it is in contact with shaft 6 and part of the load is carried at this point.

The springs which facilitate the quick removal of the shaft and rollers are pivoted to the handle at 13 where the ends are peened over to prevent the spring from falling out. As shown in Fig. 3, the resilient wire 7 contacts the upper surface of the runner at 14 whereby in a free or released position it is clear of the ground and above the runners. The end 15 of each spring is bent up and fits into a hole in shaft 6. When assembled, the spring is under tension so that shaft 6 is held firmly against the runner part of handle 3. The springs 7 and 7' transmit the thrust fore and aft and also prevent rotation of shaft 6. Removal of the roller assembly is obtained simply and without the aid of tools by merely pressing the springs downwardly to eject ends 15 from the holes in the shaft.

The rollers are provided with circular end plates or washers 16 secured thereto to retain felt seals 17 which prevent the entry of dirt into the bearings. Endwise motion of the rollers is prevented by rib 12 and the runners of handle 3. Since the contact surfaces are only above shaft 6, grass or similar matter caught between washers 16 and their adjoining fixed surfaces is cut and may fall out because the space below the shaft is open.

While lawn rollers of conventional design are usually constructed of a hollow drum that is to be filled with water to obtain a desired weight, in this improved device the necessary weight is provided by placing a sufficient amount of ballast of any kind into the tray. The latter has a flat bottom to make it more suitable for carrying a bushel basket or box, or to provide a convenient seat.

While I have shown two rollers in this preferred embodiment, I do not wish to be limited to this number alone. The reason for using a plurality of rollers is to make turning on an arc more easy, but where cheapness of construction is a prime requisite, a single roller may be used.

I claim:

1. A combination garden cart, lawn roller, and sled, comprising a tray, a pair of sled runners secured under said tray, a transverse axle arranged underneath said runners and being provided with a vertical hole at each end, a pair of rollers arranged to revolve on said axle, a resilient wire at each end of said axle having one end secured to a runner and the other engaging said hole from underneath to urge the axle upwardly against said runner to hold it rigidly in a fore and aft direction, as well as to facilitate quick removal of said rollers and shaft when said wire is disengaged manually from said axle, a longitudinal reinforcing rib secured to said tray intermediate said rollers to rest on said axle, and a handle extending from said tray.

2. A combination garden cart, lawn roller, and sled comprising a low positioned receptacle adapted to serve as the receptacle of a cart, sled runners arranged under said receptacle and extending beyond said receptacle to serve as a handle for pushing and pulling said combination cart, a lawn roller of relatively small diameter revolubly arranged under said receptacle, and members to hold said roller underneath said tray in a transverse position, said members being adapted for quick removal of said roller and arranged to be positioned fully above said runners when said roller is removed.

3. A combination garden tray, lawn roller, and sled, comprising a tray adapted to serve as the tray of a cart, a pair of sled runners arranged under said tray and extending beyond said tray to serve as manual means for pushing and pulling said combination cart, a removable transverse axle arranged under said tray, lawn rollers arranged to revolve about the axis of said axle, and resilient means to urge said axle against said runners to hold said axle rigidly in a transverse position, said resilient means being positioned fully above said sled runners when said axle is removed.

WILLIAM STELZER.

REFERENCES CITED

The following references are of record in the file of this patent:

UNITED STATES PATENTS

| Number | Name | Date |
|---|---|---|
| 64,748 | Colcord | May 14, 1867 |
| 83,818 | Andrew | Nov. 10, 1868 |
| 390,661 | Forsyth | Oct. 9, 1888 |
| 401,381 | Schubert | Apr. 16, 1889 |
| 1,075,336 | Custer | Oct. 14, 1913 |

FOREIGN PATENTS

| Number | Country | Date |
|---|---|---|
| 473,689 | Germany | Mar. 20, 1929 |